United States Patent
Graspeuntner et al.

(10) Patent No.: US 9,339,858 B2
(45) Date of Patent: May 17, 2016

(54) METHOD FOR ROLLER BURNISHING A CYLINDRICAL COMPONENT PART SURFACE

(71) Applicant: Robert Bosch GmbH, Stuttgart (DE)

(72) Inventors: Christian Graspeuntner, Hallein (AT); Christian Meisl, Grossgmain (AT)

(73) Assignee: Robert Bosch GmbH, Stuttgart (DE)

( * ) Notice: Subject to any disclaimer, the term of this patent is extended or adjusted under 35 U.S.C. 154(b) by 273 days.

(21) Appl. No.: 13/897,649

(22) Filed: May 20, 2013

(65) Prior Publication Data
US 2013/0312237 A1 Nov. 28, 2013

(30) Foreign Application Priority Data

May 22, 2012 (AT) .................................... 602/2012

(51) Int. Cl.
| B24B 39/00 | (2006.01) |
| B21C 37/30 | (2006.01) |
| B24B 39/02 | (2006.01) |

(52) U.S. Cl.
CPC ............ B21C 37/30 (2013.01); B24B 39/00 (2013.01); B24B 39/02 (2013.01); *Y10T 29/47* (2015.01)

(58) Field of Classification Search
CPC ...... B21C 37/30; B24B 39/00; B24B 39/003; B24B 39/02; B24B 39/045; Y10T 29/47
USPC .................. 29/90.01; 72/10.2, 10.4
See application file for complete search history.

(56) References Cited

U.S. PATENT DOCUMENTS

| 4,658,616 | A | * | 4/1987 | Bastone | ................. 72/21.4 |
| 5,829,453 | A | * | 11/1998 | White | ........ A24B 15/16 131/310 |
| 6,290,573 | B1 | * | 9/2001 | Suzuki | ........ B24B 21/06 451/307 |
| 6,568,057 | B2 | * | 5/2003 | Okeda | ........ B24B 39/023 29/90.01 |
| 8,250,720 | B2 | * | 8/2012 | Tomioka | ........ B24B 39/04 29/90.01 |
| 8,296,912 | B2 | * | 10/2012 | Shiou et al. | ......... 29/90.01 |
| 8,601,659 | B2 | * | 12/2013 | Prevey | ........ B24B 39/003 29/407.08 |
| 2008/0156104 | A1 | * | 7/2008 | Luna et al. | ............. 73/806 |
| 2009/0106961 | A1 | * | 4/2009 | Tomioka et al. | ....... 29/90.01 |
| 2009/0178261 | A1 | * | 7/2009 | Shiou et al. | ........... 29/90.01 |
| 2012/0046451 | A1 | * | 2/2012 | Kurosawa | ........ C07K 16/2803 530/387.3 |
| 2012/0204390 | A1 | * | 8/2012 | Prevey | ........ B24B 39/003 29/90.01 |
| 2013/0312237 | A1 | * | 11/2013 | Graspeuntner et al. | ... 29/90.01 |
| 2014/0165351 | A1 | * | 6/2014 | Hirano et al. | ........ 29/90.01 |

FOREIGN PATENT DOCUMENTS

| DE | 10 2009 037 233 B3 | 10/2010 | |
| JP | 2006026747 A | * 2/2006 | ......... B24B 39/04 |

* cited by examiner

*Primary Examiner* — Essama Omgba
(74) *Attorney, Agent, or Firm* — Maginot, Moore & Beck LLP

(57) ABSTRACT

A method for roller burnishing a cylindrical component part surface of a workpiece includes using a roller burnishing tool including at least one rolling element. The at least one rolling element is pressed by hydrostatic pressurization radially outwardly against the component part surface and is left to roll down on the component part surface by rotating the roller burnishing tool or the workpiece. The torque arising as a result of the friction between the at least one rolling element and the component part surface is detected and sent for evaluation.

8 Claims, 1 Drawing Sheet

METHOD FOR ROLLER BURNISHING A CYLINDRICAL COMPONENT PART SURFACE

This application claims priority under 35 U.S.C. §119 to patent application no. AT 602/2012, filed on May 22, 2012 in Austria, the disclosure of which is incorporated herein by reference in its entirety.

BACKGROUND

The disclosure relates to a method for roller burnishing an in particular cylindrical component part surface of a workpiece by using a roller burnishing tool comprising at least one rolling element, wherein the at least one rolling element is pressed by hydrostatic pressurization radially outwards against the component part surface and is left to roll down the component part surface by rotating the roller burnishing tool or the workpiece.

The disclosure relates further to a roller burnishing tool for roller burnishing an in particular cylindrical component part surface of a workpiece comprising a roller burnishing lance which can be inserted into the workpiece, at least one rolling element which is housed rotatably in the roller burnishing lance and which can be pressed by hydrostatic pressurization radially outwards against a bore wall of the bore, and can roll down the surface of the component part, and a rotary drive for the roller burnishing lance or the workpiece.

In the case of component parts having large high-pressure charged surfaces, such as occur by way of example in high pressure reservoirs of injectors or in pump collectors of a modular common rail system, failure of these high-pressure charged surfaces can happen as a result of high system pressure in the first instance because there are stochastically distributed inhomogeneities in the material which function as the cause of cracks, but which lie within the material tolerances. In order to prevent the formation of cracks at these places, the pressurized surface can be reformed by means of a mechanical processing so that superficial residual compressive stresses arise. In the case of cylindrical component parts or sections of component parts this can take place by way of example in that a superficial consolidation of the structure is carried out by means of ball roller burnishing, as described by way of example in DE 102009037233 B3.

Ball roller burnishing generally takes place so that the roller burnishing tool, consisting of a roller burnishing lance and several, preferably at least three, roller burnishing balls, is inserted into the cylindrical component part which is to be processed. The roller burnishing balls can be impinged with hydraulic pressure via a bore formed in the roller burnishing lance. This hydraulic pressure presses the roller burnishing balls against the cylindrical component and produces at the contact point the necessary plastic deformation of the component part. Superficial residual compressive stresses thereby arise in the component part and these have the result that any potential crack origins do not lead to the component part fracturing under system pressure (e.g. 2200 bar).

With this form of solidification by means of ball roller burnishing, particular importance is placed on the process monitoring. In particular it must be ensured that the roller burnishing balls roll down in the cylindrical component part and do not jam for example as a result of impurities or chippings in the hydraulic medium and slide along the component part. The prior art provides here that prior to processing the cylindrical surface in the component part the roller burnishing tool is inserted into a pressure measuring bush in which the radial force exerted by the roller burnishing balls as a result of the prevailing pressure of the hydraulic medium is measured. The known solution regarding the monitoring of the process does not ensure that during the entire processing of a component part the roller burnishing balls roll down in the component part. By testing the radial force in a pressure measuring bush it can only be proven that the roller burnishing balls roll down the component part before or after the actual roller burnishing process. Should a chip become jammed during the roller burnishing processing which causes a roller burnishing ball to become blocked but then this chip however becomes loose again before the end of the roller burnishing processing, the faulty processing cannot be proven by means of the pressure measuring bush so that a potential safety-critical component part results with an at least in part faulty manufacture.

The object of the present disclosure is therefore to detect a blocking of the rolling element of a roller burnishing tool. The disclosure is further aimed at proving that the rolling element has rolled down the component part throughout the entire roller burnishing process and that a blocking, even if temporarily, of the rolling element has not occurred.

SUMMARY

To achieve this object the disclosure proposes essentially, starting from a method of the type already mentioned at the beginning, that the torque arising as a result of the friction between the at least one rolling element and the component part surface, or a measured value representing the torque, is detected and supplied for an evaluation. The disclosure is based on the fact that as the rolling element rolls down, a rolling friction occurs which in the event of a blocking of the rolling element changes into sliding friction. Sliding friction is characterized in that it has a significantly higher coefficient of friction than the rolling friction. An increased torque thereby arises. By constantly detecting this torque or a measured value which represents the torque it is now possible to monitor the roller burnishing process continuously in a simple manner.

The drive power of the rotary drive of the roller burnishing tool or workpiece can preferably be detected as the measured value representing the torque. In the event of an electric rotary drive the electric power consumption of the motor can be detected by way of example for this purpose. More particularly this is the motor for the rotary drive of the workpiece, thus by way of example the lathe in which the workpiece is clamped.

Alternatively the torsion of the roller burnishing tool, more particularly the roller burnishing lance, can be measured as the measured value representing the torque.

The evaluation of the detected torque or the corresponding measured value can take place in a different way. The evaluation preferably in each case depends on detecting a state which suggests the blocking of the at least one rolling element. In the event of a number of rolling elements, the evaluation is preferably configured so that the blocking of just one single rolling element is detected. The process is preferably carried out in this connection so that the evaluation comprises the generation of a signal in dependence on the detected torque or on the measured value representing the torque which causes the interruption of the roller burnishing process. Alternatively, in place of the interruption of the roller burnishing process the hydrostatic pressurization of the rolling element, i.e. the radial pressing force, can be increased provided no inadmissible stress conditions arise in the bore wall.

More particularly it can be proposed that the evaluation comprises comparing the detected torque or the measured value representing the torque with a predetermined boundary value. The roller burnishing is then preferably interrupted when the boundary value is exceeded.

The detected torque or the detected measured value can preferably be recorded continuously and stored in order to be available for a later evidence that the rolling element has rolled down the component part during the entire roller burnishing process.

When processing cylindrical surfaces of component parts, more particularly cylindrical bores, it is advantageous if the at least one rolling element is formed by a ball.

A preferred procedure further proposes that a cooling lubricant is branched off from a production unit, more particularly a lathe, and supplied to the roller burnishing tool as hydraulic medium for the hydrostatic pressurization of the rolling element. More particularly this can hereby be that production unit in which the workpiece which is to be processed is clamped, e.g. a lathe, with which the workpiece is driven in rotation.

As already mentioned, an advantageous application of the method lies in the workpiece being a high pressure reservoir or a pump collector of a modular common rail injection system of internal combustion engines.

To achieve this objective the disclosure further proposes, starting from a roller burnishing tool of the type already mentioned, essentially that detection means are provided for detecting the torque which arises as a result of the friction between the at least one rolling element and the surface of the component part, or a measured value representing the torque, and an evaluation unit to which the torque or the measured value detected by the detection means is supplied.

Further advantageous embodiments of the roller burnishing tool are apparent from the description below.

BRIEF DESCRIPTION OF THE DRAWINGS

The disclosure will now be explained in further detail with reference to an embodiment shown diagrammatically in the drawing. In this.

DETAILED DESCRIPTION

Figure 1:
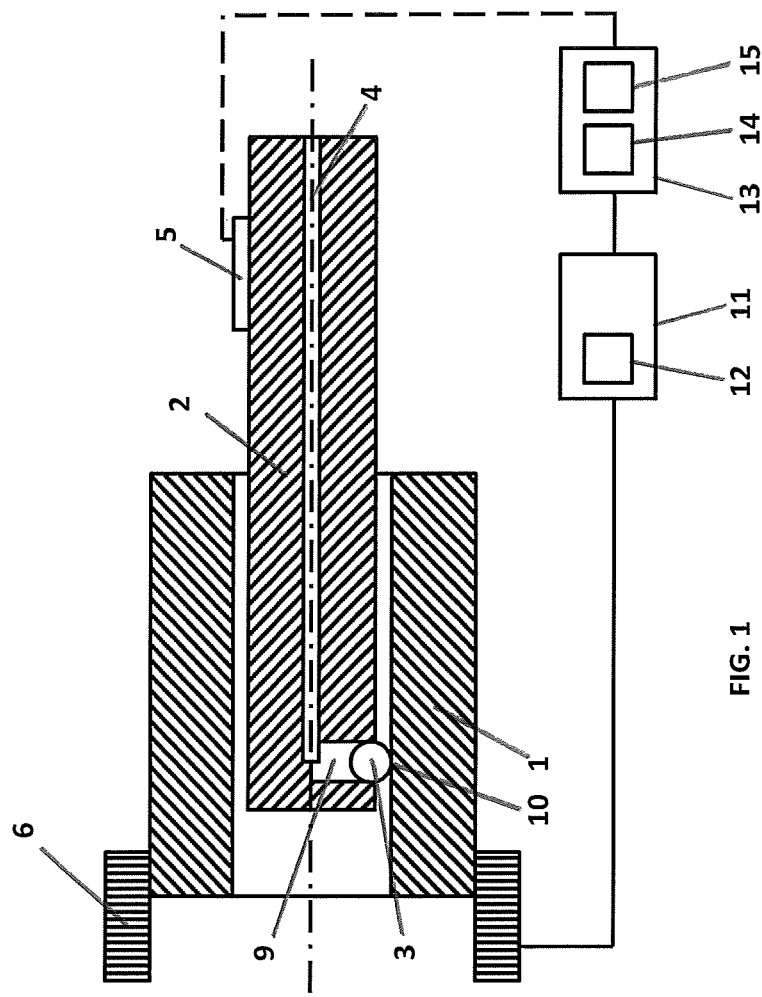
FIG. 1 shows a longitudinal section through the roller burnishing tool according to the disclosure.

FIG. 1 shows diagrammatically a schematic view of the ball roller burnishing. The roller burnishing tool, consisting of a roller burnishing lance 2 and several, preferably at least three, roller burnishing balls 3, is inserted into a cylindrical workpiece 1, e.g. a reservoir tube of an injector, which is clamped by the tension jaws 6 in a production unit, e.g. a lathe, and can be set in rotation. The roller burnishing balls 3 can be supplied through the bore 4 which is attached to the roller burnishing lance 2, with hydraulic pressure, by way of example can be supplied from the cooling lubricant supply of the production unit. This hydraulic pressure presses the roller burnishing balls 3, which are guided in ball guide bores 9 with very little play relative to the roller burnishing balls 3, against the wall of the bore which is formed in the cylindrical workpiece 1, and produces at the contact place 10 the required plastic deformation of the workpiece 1.

Figure 2:
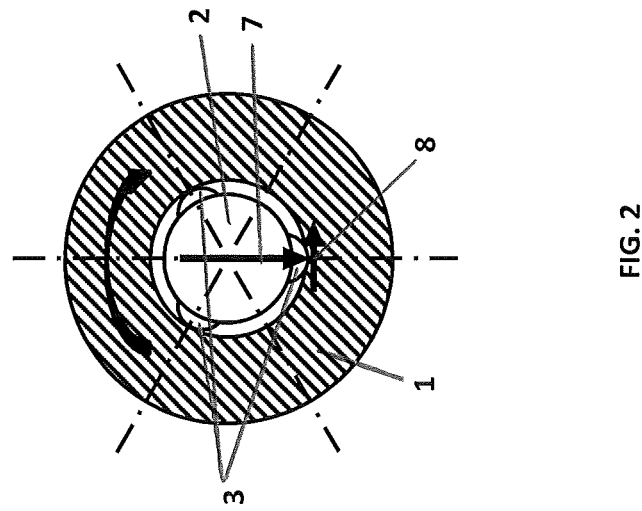
FIG. 2 shows a cross-section through the roller burnishing tool according to FIG. 1.

With the present embodiment the diameter of a roller burnishing ball amounts to 12 mm, the pressure of the cooling lubricant amounts to 50 bar. A hydraulic radial force (7) is thereby produced (FIG. 2) of $$F_k = d_k^2 \frac{\pi}{4} \rho_{hyd} = (12 \text{ mm})^2 \frac{\pi}{4} \cdot 50 \text{ bar} = 565 \text{ N}$$

On assuming a typical coefficient of rolling friction in a ball bearing of 0.001 then a tangential force 8 is achieved of $$F_t = c_{roll} F_k = 0.001 \cdot 565 \text{N} = 0.5 \text{N}$$

From this arises a required torque in order to be able to rotate by way of example three roller burnishing balls 3 in the component part 1, whilst assuming an internal diameter 35 mm of the workpiece 1 at $$M_{roll} = n F_t d_b = 3 \cdot 0.5 \text{N} \cdot 35 \text{ mm} = 0.053 \text{ Nm}$$

If now one of the balls jams, then the rolling friction at this ball is changed into sliding friction. Sliding friction is characterized in that it has a significantly higher coefficient of friction, by way of example 0.1 (steel on steel). An increased torque is thereby produced $$M_{gleit} = c_{gleit} F_k d_B = 0.1 \cdot 565 \text{N} \cdot 35 \text{ mm} = 2.0 \text{ Nm}$$

With a speed of 1000/min an additional required power is thus produced in the rotary drive of the production unit of $$P = 2\pi M_{gleit} n_{MAE} = 2 \cdot \pi \cdot 2,0 \text{ Nm} \cdot \frac{1000/\text{min}}{60 \text{ s/min}} = 209 \text{ W}$$

Within the scope of the disclosure the required drive power of the production unit is now to be monitored. If a blocking of a roller burnishing ball 3 happens, then this can be detected by an increase in the drive power and the roller burnishing process can be stopped. For this purpose the rotary drive marked diagrammatically by 11 is equipped with an integrated unit 12 for detecting the electrical power consumption of the rotary drive 11. The measured values of the unit 12 are supplied to the evaluation unit 13 in which the measured values are compared by means of a comparison circuit 14 with a predetermined boundary value. When the boundary value is exceeded then the evaluation unit 13 generates a signal which is supplied to the rotary drive 11 and leads to the rotary drive 11 being switched off. The evaluation unit 13 furthermore has an integrated memory 15 in which the measured values received by the unit 12 are provided with a time stamp and stored. The evaluation unit 13 has an interface (not shown) via which the data contained in the memory 15 can be read and can be further processed for subsequent supplementary evaluations for evidence purposes.

Alternatively, instead of the evaluation of the drive power of the rotary drive 11 it is also possible to measure and evaluate the torsion strain which occurs on the roller burnishing lance 2 and which is proportional to the torque. Here additionally an expansion measuring strip bridge 5 is mounted on the roller burnishing lance 2 and used to record the torsion of the stationary roller burnishing lance 2.

What is claimed is:
1. A method for roller burnishing a cylindrical component part surface of a workpiece comprising:
using a roller burnishing tool including at least one rolling element, wherein the at least one rolling element is pressed by hydrostatic pressurization radially outwardly against the component part surface and is left to roll down the component part surface by rotating the roller burnishing tool or the workpiece;

detecting torque or a measured value representing the torque which arises as a result of friction between the at least one rolling element and the component part surface;

supplying the detected torque or measured value representing the torque for evaluation; and determining whether the detected torque or measured value representing torque indicates that the at least one rolling element is rolling or sliding with respect to the component part surface based on the evaluation.

2. The method according to claim 1, wherein the evaluation includes:

comparing the detected torque or measured value representing the torque with a predetermined boundary value.

3. The method according to claim 2, wherein the roller burnishing is interrupted when the boundary value is exceeded.

4. The method according to claim 1, the detecting torque or a measured value representing the torque comprising detecting a drive power of a rotary drive of the roller burnishing tool.

5. The method according to claim 1, the detecting torque or a measured value representing the torque comprising detecting a torsion of the roller burnishing tool as the measured value representing the torque.

6. The method according to claim 1, wherein the at least one rolling element is a ball.

7. The method according to claim 1, further comprising:

supplying a cooling lubricant that is branched off from a production unit to the roller burnishing tool as hydraulic medium for the hydrostatic pressurization of the at least one rolling element.

8. The method according to claim 1, wherein the workpiece is one of a high pressure reservoir and a pump collector of a modular common rail injection system of internal combustion engines.

* * * * *